Dec. 30, 1969   R. S. ALWITT   3,487,270
CAPACITOR WITH ELECTROLYTE HAVING DIMETHYLSULFOXIDE
AND A COSOLVENT
Filed Dec. 19, 1967
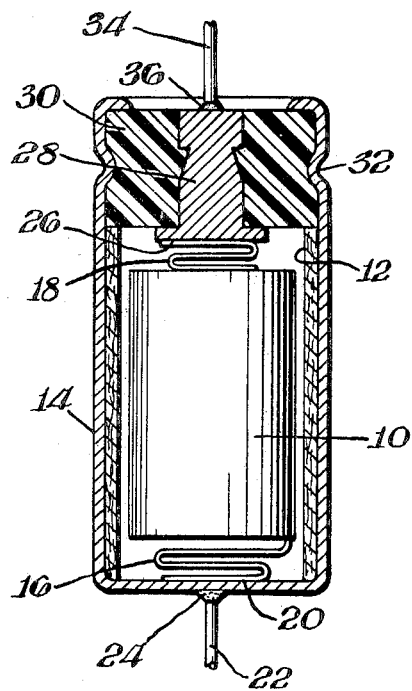

United States Patent Office

3,487,270
Patented Dec. 30, 1969

1

3,487,270
CAPACITOR WITH ELECTROLYTE HAVING DIMETHYLSULFOXIDE AND A COSOLVENT
Robert S. Alwitt, Williamstown, Mass., assignor to Sprague Electric Company, North Adams, Mass., a corporation of Massachusetts
Filed Dec. 19, 1967, Ser. No. 691,893
Int. Cl. H01g 9/00, 5/22
U.S. Cl. 317—230                             2 Claims

ABSTRACT OF THE DISCLOSURE

An electrolytic capacitor having a pair of electrodes, at least one of which is an anodized valve metal; a dielectric spacer separating said electrodes; an electrolyte of an ionogen dissolved in a mixture of dimethylsulfoxide and a cosolvent.

BACKGROUND OF THE INVENTION

This invention relates to an electrolytic capacitor and more particularly to one employing dimethylsulfoxide (DMSO) as a major component of a mixed electrolyte solvent.

Unlike vacuum tube circuits, modern transistor circuits require low impedance electrolytic capacitors. This means that electrolytic capacitors used in transistor circuits must have lower equivalent series resistance (ESR) than has previously been required. To a good approximation, the ESR of an electrolytic capacitor is the sum of the resistances of the dielectric oxide and the electrolyte-impregnated spacer paper. For voltage ratings used in transistor circuits (less than 100 v.) these resistances are of the same magnitude at room temperature, using conventional electrolyte spacer materials. The ESR of the oxide is proportional to oxide thickness and this cannot be reduced below some safe value for a particular voltage rating. Thus, in order to minimize capacitor ESR, it is necessary to reduce the resistance of the electrolyte-spacer combination.

Two types of paper spacers are commonly used in electrolytic capacitors. A thick porous paper, such as Manila paper of two to three mils thickness, and a hard, dense paper, such as kraft and Benares papers, of one-half to one mil thickness. To achieve good volumetric efficiencies, it is desirable to use the thinner paper, but this is not always possible because the higher electrical resistivity of this paper may not be fully compensated by its reduced thickness. For example, two sets of three-volt capacitors were constructed using the same foil and electrolyte, but with three-mil Manila paper in one set and one mil Benares paper in the other. Electrical measurements at 25° C. were as follows:

| Paper | C | RC | ESR |
|---|---|---|---|
| Manila | 291 | 137 | .47 |
| Benares | 557 | 405 | .73 |

The difference in capacitance illustrates the relative volumetric efficiences with these papers. If all other things were equal, the use of about twice as much foil with the Benares paper should have resulted in one-half the ESR, compared with the Manila paper construction. Instead, the ESR with Benares paper was about 50% more than that with Manila paper. This was due entirely to the high resistance of the impregnated Benares paper.

The resistance of impregnated paper depends not only on the electrolyte resistivity but also on the specific solvent used in the electrolyte. Thus, the resistance of dense paper impregnated with a glycol borate electrolyte is not very much greater than that of porous paper so impregnated. However, the resistivity of these electrolytes is sufficiently high, particularly below room temperature, to preclude their use even with a porous paper, when a low ESR is required. Electrolytes using dimethylformamide as the solvent have quite satisfactory performance with dense paper, but this solvent is reactive towards most polymeric materials and to cope with this, special seal materials, e.g. Teflon, must be employed. This prevents their use in most aluminum electrolytic capacitors.

The art would be significantly advanced if an electrolyte composition could be discovered which does not have the foregoing prior art drawbacks and thus could effectively be used with a hard, dense paper. A particularly advantageous electrolyte composition would be one that not only could be employed with dense paper but with comparatively thick porous paper. This would avoid the need to make two separate electrolyte formulations depending upon the type of a spacer paper selected.

It is an object of this invention to present a capacitor employing a hard dense spacer paper material and a novel, low resistance electrolyte which imparts a low resistance to the impregnated paper.

It is a further object to present a capacitor employing either a hard, thin dense spacer paper or a soft, porous spacer paper with the novel electrolyte composition of the present invention.

It is yet another object of the invention to present an electrolytic capacitor effective over a wide range of temperatures.

SUMMARY OF THE INVENTION

This invention relates to an electrolytic capacitor having a pair of electrodes, at least one of which is an anodized valve metal, and an electrolyte consisting essentially of an ionogen dissolved in a solvent mixture of dimethylsulfoxide with a member of the group consisting of:

| | Volume percent |
|---|---|
| Methyl Cellosolve | 35–65 |
| Ethylene glycol | 25–50 |
| Ethylene cyanohydrin | 25–65 |
| Isopropanol | 35–65 |
| Butyronitrile | 35–65 |
| Butyrolactone | 35–80 |
| Propylene carbonate | 35–80 |
| N-methyl pyrrolidone | 35–80 |

In a more limited sense, the invention relates to a capacitor of the above-described type, including hard, dense spacer paper separating said electrodes.

The electrical resistance of impregnated capacitor paper such as kraft or Benares, depends markedly on the electrolyte solvent; the lowest resistance being realized in those solvents that have the greatest ability to swell cellulose. DMSO has been observed to swell kraft or Benares papers to a greater extent than any other organic solvent taught to have utility as an electrolyte solvent for electrical capacitors. It is hypothesized that dense paper, such as kraft and Benares papers, is not of uniform density across its thickness, but rather there is a dense inner region. In the densest region, the interstices would be of molecular dimension. In solvents of poor swelling ability the dense region would act like a membrane and account for most of the electrical resistance. In DMSO under free-swelling conditions, this dense region swells sufficiently so that the whole sheet acts like a homogeneous macroscopically porous medium. Even while under constraint as in a rolled capacitor, the dense membrane portion of the paper swells at the expense of the less dense regions. Thus, the membrane portion of the constrained paper is more swollen and hence has a lower resistance than in a poorer swelling solvent under equilibrium conditions.

BRIEF DESCRIPTION OF THE DRAWING

The drawing shows a capacitor assembly which utilizes the liquid electrolyte of the present invention. The capacitor assembly comprises a convolutely wound capacitance section 10, a dielectric liner 12 and a metal can 14. Electrode tabs 16 and 18 extend from opposite ends of the capacitance section. Tab 16 is welded at 20 to the bottom of can 14. Lead 22 is welded at 24 to the outside of the bottom of can 14. Tab 18 is welded at 26 to a metal plug 28. The metal plug 28 is surrounded by an elastomer seal 30. Seal 30 is held in place by the spun-in region 32 of can 14. A lead 34 is welded at 36 to metal plug 28. The capacitance section is impregnated with the electrolyte of the present invention.

DETAILED DESCRIPTION OF THE INVENTION

The electrolytes contemplated herein are made with an electrolyte solvent mixture which includes dimethylsulfoxide. The dimethylsulfoxide imparts a very low resistance to impregnated kraft and Benares paper. Pure dimethylsulfoxide freezes at 18° C. and therefore, it cannot be used as the sole solvent component, as commercial electrolytic capacitors must be capable of operating at lower temperatures. For the purposes of the present invention, a satisfactory electrolyte made with a mixed solvent of DMSO with another solvent, must have the property of reducing the resistance of an impregnated spacer paper below that value that would be obtained in the absence of DMSO. This can be easily determined by measuring the electrical permeability ($K_e$) of the paper in each electrolyte. Electrical permeability is defined as the ratio of the resistivity of a slab of electrolyte to that of an electrolyte impregnated spacer of the same dimensions. The higher the value of $K_e$, the lower will be the resistance of the paper in a capacitor.

Values of $K_e$ were determined for Benares paper soaked overnight at 85° C. in electrolytes consisting of sodium salicylate as the solute and a mixed solvent containing DMSO as one component thereof. The results are listed in Table 1.

TABLE 1
[$K_e$ of Benares paper at 85° C.]

| Second Solvent | Volume percent DMSO | | | | |
| --- | --- | --- | --- | --- | --- |
|  | 0 | 20 | 35 | 50 | 75 |
| Methyl Cellosolve | .04 | .05 | .05 | .14 | |
| Ethylene glycol | .13 | | | .12 | .19 |
| Ethylene cyanohydrin | .07 | .05 | .04 | .10 | |
| Isopropanol | ~.04 | | | .10 | |
| Butyronitrile | <.07 | | | .13 | |
| Butyrolactone | .06 | .09 | .10 | .17 | |
| Propylene carbonate | ~.06 | | | .14 | |
| N-methyl pyrrolidone | .12 | .15 | .17 | .20 | |

It is seen that the minimum fraction of DMSO needed to cause an increase in $K_e$ varies with the second solvent component. With butyrolactone and N-methyl pyrrolidone as little as 20% DMSO causes a substantial increase in $K_e$. Use of methyl Cellosolve or ethylene cyanohydrin require more than 35% DMSO, while with ethylene glycol more than 50% DMSO must be present to significantly increase $K_e$. In all cases, the presence of sufficient DMSO produced a substantial increase in $K_e$. Based upon experience with both methyl and ethyl Cellosolve, there is no doubt that the same volume percent of DMSO would cause a substantial increase in $K_e$ in an ethyl Cellosolve-DMSO mixture as was effected in the methyl Cellosolve-DMSO mixtures. Freezing points of several solvent mixtures were measured and are listed in Table 2.

TABLE 2.—FREEZING POINTS (° C.) OF SOLVENT MIXTURES

| Second Solvent | Volume percent DMSO | | |
| --- | --- | --- | --- |
|  | 50 | 65 | 75 |
| Methyl Cellosolve | <−55 | −12 | |
| Ethylene glycol | −40 | −28 | −21 |
| Ethylene cyanohydrin | <−55 | −25 | −14 |
| Isopropanol | −36 | | |
| Butyronitrile | −30 | | |
| Butyrolactone | −25 | −10 | |
| Propylene carbonate | −25 | | |
| N-methyl pyrrolidone | −36 | −8 | |
| Dimethylformamide | −15 | | |
| Dimethylacetamide | −15 | | |

From the results shown in Tables 1 and 2, limits for the volume percent of the second solvent employed with DMSO are established.

TABLE 3.—SECOND SOLVENT CONTENT OF DMSO, SECOND SOLVENT SYSTEM

| Second solvent | Volume percent second solvent | |
| --- | --- | --- |
|  | More than— | Less than— |
| Methyl Cellosolve | 35 | 65 |
| Ethyl Cellosolve | 35 | 65 |
| Ethylene glycol | 25 | 50 |
| Ethylene cyanohydrin | 25 | 65 |
| Isopropanol | 35 | 65 |
| Butyronitrile | 35 | 65 |
| Butyrolactone | 35 | 80 |
| Propylene carbonate | 35 | 80 |
| N-methyl pyrrolidone | 35 | 80 |

Typical examples of capacitors within the scope of the present invention are the valve metal capacitors such as tantalum, niobium and aluminum capacitors. The preferred spacer materials of this invention are kraft and Benares paper of a thickness of about one-half to one mil. Prior art solutes are contemplated.

While the electrolyte system of the present invention is shown to have particular advantages when employed with a hard, dense spacer paper, it can also be employed with a comparatively soft porous spacer paper. Capacitors employing the subject electrolyte and a porous paper exhibit less capacitance decrease and less ESR decrease at low temperatures than when an electrolyte not containing DMSO is employed. A further advantage is that a separate electrolyte system need not be prepared when a soft porous spacer paper is employed.

Since it is obvious that many changes and modifications may be made in the above-described details without departing from the spirit and scope of the invention, it is to be understood that the invention is not limited to said details except as set forth in the appended claims.

What is claimed is:

1. An electrolytic capacitor having a pair of electrodes, at least one of which is an anodized valve metal; and an electrolyte consisting essentially of an ionogen dissolved in a solvent mixture of dimethylsulfoxide with a member of the group consisting of:

| | Volume percent |
|---|---|
| Methyl Cellosolve | 35–65 |
| Ethyl Cellosolve | 35–65 |
| Ethylene glycol | 25–50 |
| Ethylene cyanohydrin | 25–65 |
| Isopropanol | 35–65 |
| Butyronitrile | 35–65 |
| Butyrolactone | 35–80 |
| Propylene carbonate | 35–80 |
| N-methyl pyrrolidone | 35–80 |

2. The capacitor of claim 1 including a hard, dense dielectric spaced paper separating said electrodes.

References Cited

UNITED STATES PATENTS

| 2,965,690 | 12/1960 | Petersen et al. | 317—230 |
| 3,302,071 | 1/1967 | Stahr | 317—230 |
| 3,325,697 | 6/1967 | Ross | 317—230 |

JAMES D. KALLAM, Primary Examiner

U.S. Cl. X.R.

252—62.2